United States Patent
Laclef et al.

(10) Patent No.: US 11,774,959 B2
(45) Date of Patent: Oct. 3, 2023

(54) SYSTEMS AND METHODS FOR PROVIDING MACHINE CONFIGURATION RECOMMENDATIONS

(71) Applicant: Caterpillar Paving Products Inc., Brooklyn Park, MN (US)

(72) Inventors: Sean Robert Laclef, Taize (FR); Eric Steven Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 379 days.

(21) Appl. No.: 16/943,244

(22) Filed: Jul. 30, 2020

(65) Prior Publication Data
US 2022/0035364 A1 Feb. 3, 2022

(51) Int. Cl.
*G05D 1/00* (2006.01)
*G05D 1/02* (2020.01)
*G07C 5/08* (2006.01)

(52) U.S. Cl.
CPC ......... *G05D 1/0022* (2013.01); *G05D 1/0217* (2013.01); *G05D 1/0221* (2013.01); *G07C 5/0841* (2013.01); *G05D 2201/0202* (2013.01)

(58) Field of Classification Search
None
See application file for complete search history.

(56) References Cited

U.S. PATENT DOCUMENTS 6,782,644 B2 8/2004 Fujishima et al.
9,809,956 B1* 11/2017 Sherlock ................ E02F 3/841
10,042,359 B1* 8/2018 Konrardy ................ G06F 21/32
10,474,155 B2 11/2019 Wei
2013/0054075 A1 2/2013 Montgomery
2016/0253595 A1* 9/2016 Mathur .............. G01N 33/0098
706/12
2017/0114637 A1* 4/2017 Berning ................. E01C 21/00
2019/0106862 A1 4/2019 Ono et al.
2019/0146426 A1* 5/2019 Blank .................. A01D 41/127
701/50
2019/0309500 A1* 10/2019 Horii ..................... E02F 9/2033
2019/0354081 A1* 11/2019 Blank ................ G05B 19/4083
2020/0011033 A1* 1/2020 Sherlock ................ E02F 9/262

(Continued)

FOREIGN PATENT DOCUMENTS

CN         109448116       3/2019
JP         2017173986 A  *  9/2017  ............. A01B 69/00
WO        WO2019189888   10/2019

*Primary Examiner* — Anne Marie Antonucci
*Assistant Examiner* — Amelia Vorce
(74) *Attorney, Agent, or Firm* — Lee & Hayes, PC

(57) ABSTRACT

A system includes one or more processors configured to generate recommended machine settings associated with machine operating parameters. The system receives sensor data associated with an environment of a machine. Based on the sensor data, the system determines one or more settings associated with operating parameters for the machine, to optimize the efficiency thereof. The system causes a recommendation to apply the setting to be presented on a display associated with the machine, such as for an operator to accept. In some examples, the operator manually applies the setting(s). In some examples, the system causes a computing device of the machine to apply the setting(s). The system may continuously and/or periodically provide recommendations as conditions in the environment change.

18 Claims, 9 Drawing Sheets

(56) References Cited

U.S. PATENT DOCUMENTS

| | | | |
|---|---|---|---|
| 2020/0110417 A1* | 4/2020 | Utter .................... | G05D 1/0225 |
| 2021/0079600 A1 | 3/2021 | Berning | |
| 2021/0230841 A1* | 7/2021 | Kurosawa ............. | E02F 9/2033 |
| 2021/0325876 A1* | 10/2021 | Schlacks, IV .......... | E02F 9/205 |

* cited by examiner

SYSTEMS AND METHODS FOR PROVIDING MACHINE CONFIGURATION RECOMMENDATIONS

TECHNICAL FIELD

The present disclosure relates to systems and methods for providing machine configuration recommendations based in part on sensor data associated with an environment. More specifically, the present disclosure relates to systems and methods for receiving sensor data associated with the environment, and determining one or more parameters for a vehicle to optimize performance of the vehicle in the environment.

BACKGROUND

Machinery in various industries is becoming increasingly more complicated to operate. Often the machinery includes computing systems with various parameters that must be set prior to and/or during operation. As the machinery increases in complexity, the number of parameters requiring attention increases dramatically. For example, a computing system associated with a machine manages a speed range of the machine (e.g., maximum speed, minimum speed), rotor speeds, and sensor systems that are used to assist in operation, and on some such machines, each of these parameters is manually selected or otherwise set by an operator. As the number of operating parameters increases, the difficultly in determining settings for such parameters that will result in optimal machine performance also increases.

Additionally, optimal parameters for machinery may differ based on the location and/or environment in which the machine is operating, as well as the task being performed by the machine. For example, settings that optimize machine efficiency when performing a task (e.g., digging, loading, dumping, etc.) at a first location (e.g., a first worksite in first geographic region, etc.) may differ from settings that optimize efficiency for the same machine when performing such a task at a second location (e.g., a second worksite in a second geographic region). For another example, settings that optimize machine efficiency when performing a task at a beginning of a work day at a first temperature may differ from the settings that optimize efficiency of the same machine when performing the task in the middle of the day at a second temperature. An operator of the machinery may be unaware of the different settings at a given worksite throughout a work day, such as to optimize the capabilities of the machinery.

Chinese Patent Application Number 109448116A (hereinafter, the "'116 reference") describes a system for generating a building information modeling (BIM) three-dimensional model of a worksite in order to manage personnel and equipment at a construction site. The system gathers sensor data associated with the worksite, which is accessible to personnel via user interface associated with the BIM model. However, the '116 patent does not describe receiving sensor data and determining settings that optimize efficiency of a machine operating at the worksite.

Example described in the present disclosure are directed toward overcoming the deficiencies noted above.

SUMMARY

In an aspect of the present disclosure, a system is configured to receive sensor data generated by a sensor, the sensor being carried by a machine disposed at a worksite, and the sensor data being indicative of a condition of the worksite. The system is further configured to generate, based at least in part on the sensor data, a recommended setting corresponding to an operating parameter of the machine. The server computing system is further configured to cause a display of the machine to provide a recommendation, the recommendation indicating the recommended setting.

In another aspect of the present disclosure, a method includes receiving, from a sensor disposed at a worksite, sensor data indicative of a condition of the worksite. The method further includes generating, based at least in part on the sensor data, a recommended setting corresponding to an operating parameter of a machine. The method further includes causing a display of the machine to provide a recommendation, the recommendation indicating the recommended setting.

In yet another aspect of the present disclosure, a cold planer disposed at a worksite is configured to send, to a remote computing device and via a network, sensor data associated with the worksite, the sensor data generated by the one or more sensors. The cold planer is further configured to receive, from the remote computing device and based at least in part on the sensor data, a recommended setting associated with an operating parameter of the cold planer. The cold planer is further configured to present a recommendation on the display, the recommendation including the recommended setting. The cold planer is further configured to receive, via a user interface associated with the display, an indication of acceptance of the recommended setting. The cold planer is further configured to modify an operation of a component of the cold planer based at least in part on the recommended setting.

DETAILED DESCRIPTION

Figure 1:
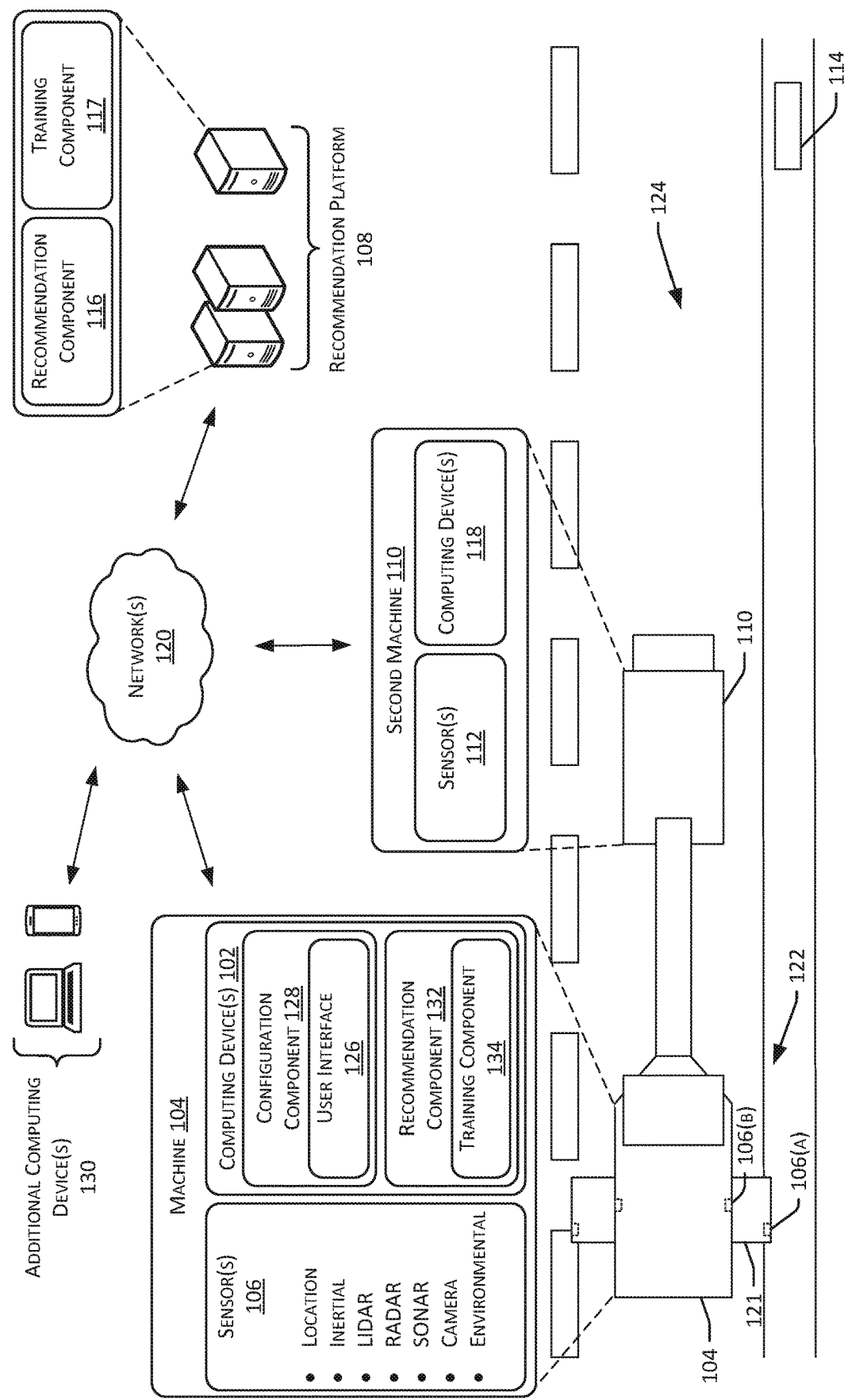
FIG. 1 illustrates an example system usable to implement machine configuration recommendations, in accordance with examples of this disclosure.

Wherever possible, the same reference numbers will be used throughout the present disclosure to refer to the same or like parts FIG. 1 illustrates an example system 100 usable to provide machine configuration recommendations, such as recommended settings for various machine operating parameters, via a computing device 102 associated with a machine 104. In some examples, the configuration recommendations include operating instructions (e.g., recommended direction of travel, etc.), and/or consumable components to be incorporated in the machine 104 to optimize the performance of various tasks in different environments. The machine 104 includes a cold planer, a haul truck, a paver, a dozer, an excavator, an articulated truck, a compactor, a motor grader, a track loader, a wheel loader, or any other type of machine (e.g., paving equipment, mining equipment, construction equipment, etc.) configured to perform tasks at a worksite or in other environments. The machine 104 includes a manned machine (e.g., operator manually controlling parameters and operation), a semi-autonomous machine, or an autonomous machine.

In various examples, the machine configuration recommendations are provided as a set of initial operating parameters associated with an operation of the machine 104 at the worksite. In such examples, the machine configuration recommendations include initial operating instructions associated with operating in a particular portion (e.g., area) of the worksite and/or an initial amount and/or type of consumable components to be associated with the machine (e.g., loaded onto, affixed to, etc.).

In some examples, the machine configuration recommendations include one or more settings for operating parameters of the machine 104 based on one or more conditions that have changed during operation of the machine 104 at the worksite. The condition(s) include a change in location at the worksite, change in environmental conditions (e.g., temperature, precipitation, humidity, etc.), change in road conditions (e.g., grade, curvature, type of road surface, etc.), change in sensors used (e.g., sensors activated and/or deactivated), and the like.

In some examples, the machine configuration recommendations are based on one or more planned changes in a condition at the worksite. In such examples, the configuration recommendations are determined based on worksite data, such as that stored in the computing device 102, and/or other computing devices associated with the system 100 (e.g., recommendation platform 108, a computing device 118, and/or an additional computing device 130). For example, the computing device 102 stores worksite data associated with the worksite in a datastore. The worksite data includes information about a first planned depth of cut in a first area of the worksite (e.g., cut a road surface to a first depth) and a second planned depth of cut in a second area of the worksite (e.g., cut an intersection of two roads to a second depth). Based on a determination at a first time that a first location of the machine 104 is associated with the first area, a machine configuration recommendation includes a recommendation to set a first depth of cut. Based on a determination at a second time that a second location of the machine is associated with the second area, a machine configuration recommendation includes a recommendation to set a second depth of cut.

In some examples, the machine configuration recommendations are based on sensor data captured by one or more sensors located at the worksite. As illustrated in FIG. 1, the example machine 104 includes one or more sensors 106 configured to capture sensor data in an environment surrounding the machine 104 (e.g., sensors 106 disposed on the machine 104). The sensor(s) 106 include lidar sensors, radar sensors, cameras (e.g., RGB, IR, intensity, depth, time of flight, etc.), audio sensors, ultrasonic transducers, sonar sensors, location sensors (e.g., global positioning system (GPS), compass, etc.), inertial sensors (e.g., inertial measurement units, accelerometers, magnetometers, gyroscopes, etc.), environment sensors (e.g., temperature sensors, humidity sensors, light sensors, pressure sensors, etc.), and the like.

In some examples, the computing device 102 receives raw sensor data and/or processed sensor data (collectively "sensor data") from the sensor(s) 106. In some examples, the computing device(s) 102 sends the sensor data to a recommendation platform 108 for determining one or more configuration recommendations. The recommendation platform 108 includes one or more servers or other computing devices, any or all of which may include one or more processors and memory storing computer executable instructions to implement the functionality discussed herein attributable to the configuration recommendation system. The recommendation platform 108 generates one or more configuration recommendations for one or more machines, such as machine 104 and/or a second machine 110 operating in an environment.

The recommendation platform 108 receives sensor data captured by sensor(s) 106 In some examples, the recommendation platform 108 additionally or alternatively receives sensor data captured by one or more sensors 112 associated with the second machine 110 and/or one or more sensors 114 mounted in an environment. The sensor(s) 112 associated with the second machine 110 may be the same or different sensors as sensor(s) 106 associated with the machine 104. The sensor(s) 114 include one or more sensors permanently mounted in the environment and/or mobile sensors (e.g., not permanent) used in the environment due to machine operation, construction, and the like. For example, the sensor(s) 114 include one or more environmental sensors configured to determine a temperature, detect precipitation, and/or determine humidity in an operating environment.

In various examples, a recommendation component 116 of the recommendation platform 108 receives the sensor data from the computing device(s) 102, a computing device 118 associated with the second machine 110, and/or directly from the sensor(s) 114 via one or more networks 120. The network(s) 120 represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing device(s) 102 associated with the machine 104, the computing device(s) 118 associated with the second machine 110, and/or the sensor(s) 114 accesses the recommendation platform 108 and/or communicate with one another.

Based at least in part on receipt of the sensor data, the recommendation component 116 determines one or more configuration recommendations for the machine 104 and/or the second machine 110. For example, the recommendation component 116 receives temperature data from an environmental sensor 114 located in the environment. The recommendation component 116 provides a configuration recommendation to the machine 104 and/or the second machine 110 based on the temperature data received from the environmental sensor 114. For another example, the recommendation component 116 receives sensor data from the sensor(s) 106 of the machine 104 and determines a first configuration recommendation to provide to the machine 104 and a second configuration recommendation to provide to the second machine 110.

In some examples, the recommendation component 116 includes a rules engine and/or other component that indicates remedial actions to take based on sensor outputs falling outside of acceptable thresholds. For example, based on a determination that sensor data associated with the sensor(s) 106 exceeds a threshold associated with the sensor data, the recommendation component 116 processes sensor data associated with sensor(s) 112 and/or sensor 114 to determine a configuration recommendation for the machine 104.

In some examples, the recommendation component 116 is configured to output the configuration recommendation(s) based on a statistical analysis of a plurality of sensor data and corresponding production data associated with a plurality of machines (e.g., machine 104, second machine 110, etc.) operating in various environments. The production data includes an amount of work produced or completed by a machine, such as machine 104, over a certain number of hours. For example, production data associated with a cold planer includes an amount of road surface 124 removed (e.g., average amount of road surface 124 ground and transferred to a dump truck, such as the second machine 110) over a given period of time (e.g., tons per hour, over an 8-hour work day, etc.). For another example, production data associated with the cold planer includes an amount (e.g., tons) of road surface 124 removed per gallons of fuel burned. For yet another example, production data associated with a bulldozer includes an amount (e.g., tons) of material moved from a first location to a second location over a given period of time (e.g., per hour). For still yet another example, production data associated with a paver includes a length of road surface paved over a given period of time.

In some examples, the recommendation component 116 includes one or more machine learned models (e.g., data models) configured to output the configuration recommendation(s) for the machine 104 and/or the second machine 110. In some examples, the data model(s) are trained utilizing training data including sensor data, settings for operating parameters associated with a machine, production data and associated times, fuel used, fuel burn rate, and the like. In such examples, the data model(s) is configured to input sensor data associated with a machine 104 and/or the second machine 110 (e.g., location data, environmental data, operating data, etc.) and output configuration recommendation(s) for the machine 104 and/or the second machine 110.

In at least one example, the recommendation platform 108 includes a training component 117 configured to train the data model(s) to output configuration recommendations. In some examples, the training component 117 periodically (e.g., daily, weekly, monthly, etc.) and/or continuously updates the data model(s) based on updated training data comprising sensor data, settings for operating parameters, and production data associated with machines, such as the machine 104 and/or the second machine 110 in the environment. In various examples, the training component 117 updates the data model(s) responsive to receiving production data from the machine 104 and/or the second machine 110 and/or determining that the production data exceeds a threshold production data. In such examples, the training component 117 verifies the data models are trained based on production data that meets a threshold criteria, such as to ensure that provided configuration recommendations optimize performance of the machine 104 and/or the second machine 110.

In some examples, the configuration recommendations include settings associated with operating parameters for the machine 104 to set. In various examples, the settings associated with operating parameters include measurable factors associated with an operation of the machine 104. Operating parameters include a speed associated with a component of the machine (e.g., rotor speed, etc.), a speed associated with the machine (e.g., forward speed, lateral speed, etc.), a first sensor to activate, a second sensor to deactivate, a depth of cut, a propel pressure, a propel speed, an engine load, a distance to maintain from another machine and/or object, a distance to maintain from an operating boundary, or the like. For example, a recommendation component 116 determines, based on sensor data, that a side plate 121 of a machine 104 extends over a boundary 122 associated with a surface 124 (e.g., perimeter associated with the road surface 124) that the machine 104 is milling. Based on the determination that the side plate 121 is extends over boundary and is not over the surface 124, the recommendation component 116 generates a recommendation to deactivate a first sensor 106(A) configured to determine depth of a surface 124 to be milled and located on the side plate 121 and to activate a second sensor 106(B) configured to determine depth of the surface 124 to be milled that is located inboard of the side plate.

In various examples, the recommendation component 116 causes the machine 104 to display or otherwise present the recommendation including the setting associated with the operating parameter, such as via a user interface 126 of a configuration component. In some examples, the configuration component 128 receives input associated with the setting associated with the operating parameter from an operator, such as via the user interface 126. In such examples, the configuration component 128 sets the setting associated with the operating parameter based on the input from the operator.

In some examples, the user interface 126 displays or otherwise presents a selectable option with the recommendation to provide a means by which an operator of the machine 104 may quickly accept or reject the setting associated with the operating parameter. In such examples, the recommendation component may improve the functioning of the computing device 102, such as by reducing an amount of input to process via the user interface 126. In some examples, responsive to receiving an input to reject the setting associated with the operating parameter (e.g., an indication of rejection thereof), the configuration component 128 sends a message to the recommendation component 116 indicating rejection of the setting associated with the operating parameter.

In some examples, responsive to receiving an input to accept the setting associated with the operating parameter (e.g., an indication of acceptance thereof), the configuration component 128 modifies an operation of a machine component (e.g., reduce engine speed, increase rotor speed, etc.). In some examples, the recommendation includes an instruction to modify the operation of the machine component responsive to receipt of an indication of acceptance via the user interface 126. In such examples, the recommendation component 116 causes the configuration component 128 to modify the operation of the machine component responsive to the input of acceptance. In various examples, the recommendation component 116 sends an instruction to the configuration component 128 to apply the setting automatically. In such examples, the configuration component 128 receives the recommendation including the setting and automatically sets the operating parameter. For example, an autonomous machine 104 is configured to automatically apply a setting associated with the operating parameters provided by a recommendation component 116, such as to optimize a performance thereof.

In some examples, the recommendation component 116 provides operating instructions for the machine 104 and/or the second machine 110. The operating instructions include a recommendation of a path for the machine 104 and/or the second machine 110 to follow in the environment. In such examples, the recommendation component 116 processes sensor data including data associated with the surface 124 including one or more boundaries 122. In some examples, the recommended path includes a direction of travel associated with maximizing an effectiveness of machine components with respect to the boundary 122. For example, a machine 104 grinding a surface 124 operates proximate a boundary 122. The recommended path includes a direction of travel associated with the boundary 122 to optimize performance of the machine 104, such as by ensuring that an area outside the surface 124 (beyond the boundary 122) is not ground by the machine 104.

In various examples, the recommendation component 116 causes a representation of the recommended path to be displayed or otherwise presented via the user interface 126. In some examples, the recommended path includes a heading and/or range of headings for an operator to maintain. In some examples, the recommendation component 116 causes the configuration component 128 to display, emit, or otherwise present an alert (e.g., aural warning, visual warning on a display, etc.) to the operator via the user interface 126 indicating that a current heading and/or heading trend may cause the machine 104 to deviate from the recommended path. In such examples, the alert warns the operator to correct the heading.

In some examples, the alert (e.g., warning) is displayed (or is emitted) based on the operator inputting an indication of acceptance of the recommended path. In such examples, the alert system is activated based on an acceptance by the operator of the recommended path. In examples in which the machine 104 is autonomous or semi-autonomous, the recommendation component 116 sends an instruction for the computing device(s) 102 to control the machine 104 based on the recommendation. Responsive to receiving the instruction, the computing device(s) 102 controls the machine 104 according to the recommended path.

Additionally or in the alternative, the recommendation component 116 is configured to determine one or more recommended consumable components for a machine 104, based on sensor data. The consumable components include parts or other commodities used by a machine 104 that are intended to be used up during operation. Consumable components include a type of cutting tooth, a size and/or type of blade, an amount of water to be loaded on the machine 104, an amount of fuel, and the like. For example, the recommendation component 116 determines, based on a high temperature in an operating environment determined based on sensor data, that at least 90+ gallons of water may be required to cool components of a machine during an expected eight-hour work cycle. Based on the determination, the recommendation component 116 generates a recommendation to configure the machine 104 with 100 gallons of water prior to operation of the machine in the environment. For another example, the recommendation component 116 determines, based on a location associated with the machine 104, that the surface 124 includes a limestone aggregate. Based on the limestone aggregate, the recommendation component 116 determines that a particular carbite tooth should be incorporated into the machine 104 to optimize an operating performance thereof. Though these are merely illustrative examples and are not intended to be limiting.

In various examples, the recommendation component 116 causes the recommendation for consumable components to be displayed or otherwise presented on the computing device 102, such as via the user interface 126. In some examples, the recommendation component 116 causes the recommendation to be displayed or otherwise presented via an additional computing device 130 associated with the machine 104. The additional computing device 130 includes a computing device associated with a worksite manager, a maintenance employee associated with the machine 104, an operator of the machine 104, and/or others who may be responsible for a configuration of consumable components in the machine 104. For example, the recommendation component 116 causes the recommendation to be displayed or otherwise presented on a computing device 130 associated with a maintenance department associated with the machine 104.

In various examples, the computing device 102 includes a recommendation component 132. In such examples, similar to recommendation component 116, the recommendation component 132 is configured to generate one or more recommendations for operating parameters and/or operating instructions (e.g., recommended path) based on sensor data received from the sensor(s) 106. In various examples, the recommendation component 132 enables the computing device(s) 102 to provide recommendations for the operating parameters while the machine 104 is operating in an offline mode (e.g., no access to network 120 and/or the recommendation platform 108).

In various examples, the recommendation component 132 is trained to output the operating parameters and/or the operating instructions utilizing the training component 117, such as during configuration of the computing device(s) 102. In some examples, the recommendation component 132 includes a training component 134, similar to training component 117. In such examples, the training component 134 trains the data model(s) utilizing machine learning techniques to output the operating parameters and/or the operating instructions for machine 104. The training component 134 processes sensor data from the sensor(s) 106 and production data associated with the machine 104. In some examples, based on a determination that the production data meets or exceeds a threshold, the training component 134 trains the data model(s) based on the production data and/or sensor data.

FIGS. 2-8 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 2:
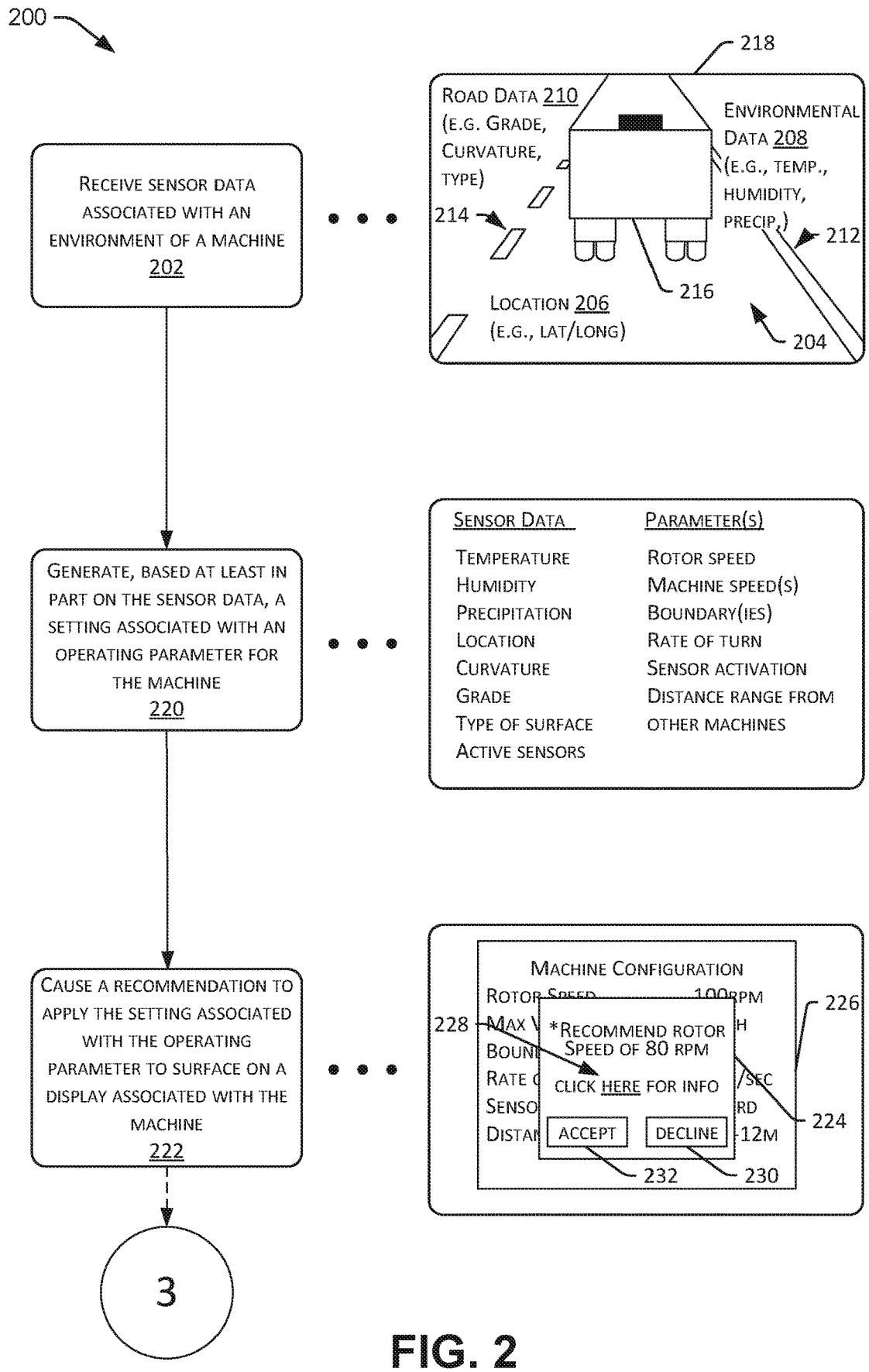
FIG. 2 includes a flow chart depicting a method for recommending a setting for an operating parameter to be associated with a machine, in accordance with examples of this disclosure.

FIG. 2 includes a flow chart depicting a process 200 for recommending a setting associated with an operating parameter of a machine, in accordance with examples of this disclosure. As discussed above, the setting associated with the operating parameter includes a speed associated with a component of the machine (e.g., rotor speed, etc.), a speed associated with the machine (e.g., forward speed, lateral speed, etc.), a first sensor to activate, a second sensor to deactivate, a depth of cut, a propel pressure, a propel speed, an engine load, a distance to maintain from another machine and/or object, a distance to maintain from an operating boundary, or the like.

At operation 202, a processor of a computing device receives sensor data associated with an environment 204 of a machine, such as machine 104 and/or the second machine 110 of FIG. 1. The processor may be associated with a computing device of a machine, such as computing device 102 or a computing device of a recommendation platform, such as recommendation platform 108. The environment 204 includes the operating environment, such as an area in which the machine operates. In some examples, the machine 104 includes a cold planer, a haul truck, a paver, a dozer, an excavator, an articulated truck, a compactor, a motor grader, a track loader, a wheel loader, or any other type of machine (e.g., paving equipment, mining equipment, construction equipment, etc.) configured to operate in an environment. In such examples, the environment 204 includes a highway, street, or other road surface, a dirt worksite, a mining worksite, a construction worksite, or any other area in which any one of the example machines listed above may operate.

As illustrated in FIG. 2, sensor data associated with the environment 204 includes location data 206 (e.g., GPS coordinates, country, state, city, township, rural region, etc.), environmental data 208 (e.g., temperature, humidity, precipitation (e.g., rain, snow, hail, etc.)), road data 210 (e.g., grade, curvature, type of road surface (e.g., dirt, asphalt, aggregate, etc.), operating boundary 212, lane boundaries 214, etc.), object data (e.g., another machine 216, other vehicles, pedestrians, etc.), and the like. In some examples, the location data 206 is indicative of a type of material used in certain applications (e.g., type of material in an aggregate, type of material used for road surfacing, etc.). The sensor data includes raw and/or processed sensor data determined by one or more lidar sensors, radar sensors, cameras (e.g., RGB, IR, intensity, depth, time of flight, etc.), audio sensors, ultrasonic transducers, sonar sensors, location sensors (e.g., global positioning system (GPS), compass, etc.), inertial sensors (e.g., inertial measurement units, accelerometers, magnetometers, gyroscopes, etc.), environment sensors (e.g., temperature sensors, humidity sensors, light sensors, pressure sensors, etc.), and the like. In some examples, the sensor data includes an indication of active (e.g., sensors providing data) and/or inactive sensors (e.g., sensors not providing data).

In some examples, a computing device associated with the machine received the sensor data to generate a representation 218 of the environment 204. In such examples, the computing device is configured to operate the machine, at least in part, based on the representation 218 of the environment 204 (e.g., autonomous or semi-autonomous machine). In some examples, a recommendation platform (e.g., server computing device) receives the raw and/or processed sensor data from the computing device associated with the machine.

At operation 220, the processor generates, based at least in part on the sensor data, one or more settings associated with operating parameters (e.g., one or more settings) for the machine. In some examples, a recommendation component of the machine determines the setting(s). In some examples, a recommendation component of the recommendation platform determines the operating parameter(s). The settings(s) include measurable factors associated with an operation of the machine.

In various examples, the processor determines a setting associated with an operating parameter based on a setting input by an operator and associated with another operating parameter of the machine. In such examples, the processor receives a first setting associated with a first operating parameter, input by an operator, and determines a second setting associated with a second operating parameter based on the input from the operator. For example, an operator inputs a first depth of cut to remove a first amount of road surface from a road. Based on the first depth of cut, the processor determines a first speed for cutting based on the first depth of cut. At a second time, the operating inputs a second depth of cut to remove a second amount of road surface from the road. Based on the second depth of cut, the processor determines a second rotor speed for cutting based on the second depth of cut, the second rotor speed being determined to be an optimized setting associated with at least the second depth of cut. Though described in this example as being determined based on an operator input associated with operation of the machine, this is not intended to be so limiting. The rotor speeds or settings associated with other operating parameters may be determined based on worksite data (e.g., information about the worksite and different operations therein stored in a datastore), sensor data including environmental data, location data, road surface data, and the like.

In the illustrative example, the setting associated with the operating parameters include a particular rotor speed, one or more machine speeds, one or more boundaries, a rate of turn (e.g., maximum or minimum rate of turn, etc.), sensor activation, distance range to maintain from other machines (e.g., 10 meters, 20 feet, etc.), though this is not intended to be limiting. The setting(s) additionally or alternatively include a speed associated with any component of the machine, sensor deactivation, a depth of cut, a propel pressure, a propel speed, an engine load, a distance to maintain from an operating boundary, or the like. For example, based on a temperature, humidity, detected at a particular location, the recommendation component determines to that operating a rotor at a first speed may optimize the performance of the machine.

At operation 222, the processor causes a recommendation 224 to apply the one or more settings associated with the operating parameters to be displayed or otherwise presented on a display 226 associated with the machine. As will be discussed in greater detail below with regard to FIG. 8, the display includes any type of display associated with the computing device of the machine. In examples in which the recommendation platform determines the setting(s) associated with the operating parameter(s), the recommendation component thereof may send an instruction to present the recommendation on the display. Responsive to receiving the recommendation 224 and/or the instruction, the computing device of the machine presents the recommendation 224 on the display 226.

In some examples, the recommendation includes a selectable option 228 to receive additional information regarding the recommendation 224. In such examples, an operator of the machine accesses the additional information to understand why the setting(s) associated with the operating parameter(s) have been recommended. In some examples, the additional information includes statistics associated with previous machine performance, such as based on production data in environments similar to environment 204. In some examples, the additional information includes expected production data associated with the recommended setting(s) versus expected production data associated with current or other setting associated with an operating parameter.

As illustrated in FIG. 2, the example recommendation 224 includes an option to decline 230 the recommendation. In some examples, the computing device of the machine receives an indication of selection of the option to decline 230 based on operator input via the display 226 and/or other input devices associated with the computing device. In some examples, responsive to receiving the indication of selection of the option to decline 230, the computing device of the machine disregards the recommendation and maintains current operating parameter settings (e.g., no change to the operating parameters).

In some examples, responsive to receiving the indication of selection of the option to decline 230, the computing device of the machine sends a message to the recommendation platform including the indication of selection of the option to decline 230. In some examples, the recommendation platform stores the indication of selection of the option to decline 230 in a database, such as for a later analysis of production data (e.g., comparing expected production value to actual production value). In some examples, based at least in part on the analysis, a training component of the recommendation platform trains a data model to output operating parameter recommendations based on the production data.

Figure 3:
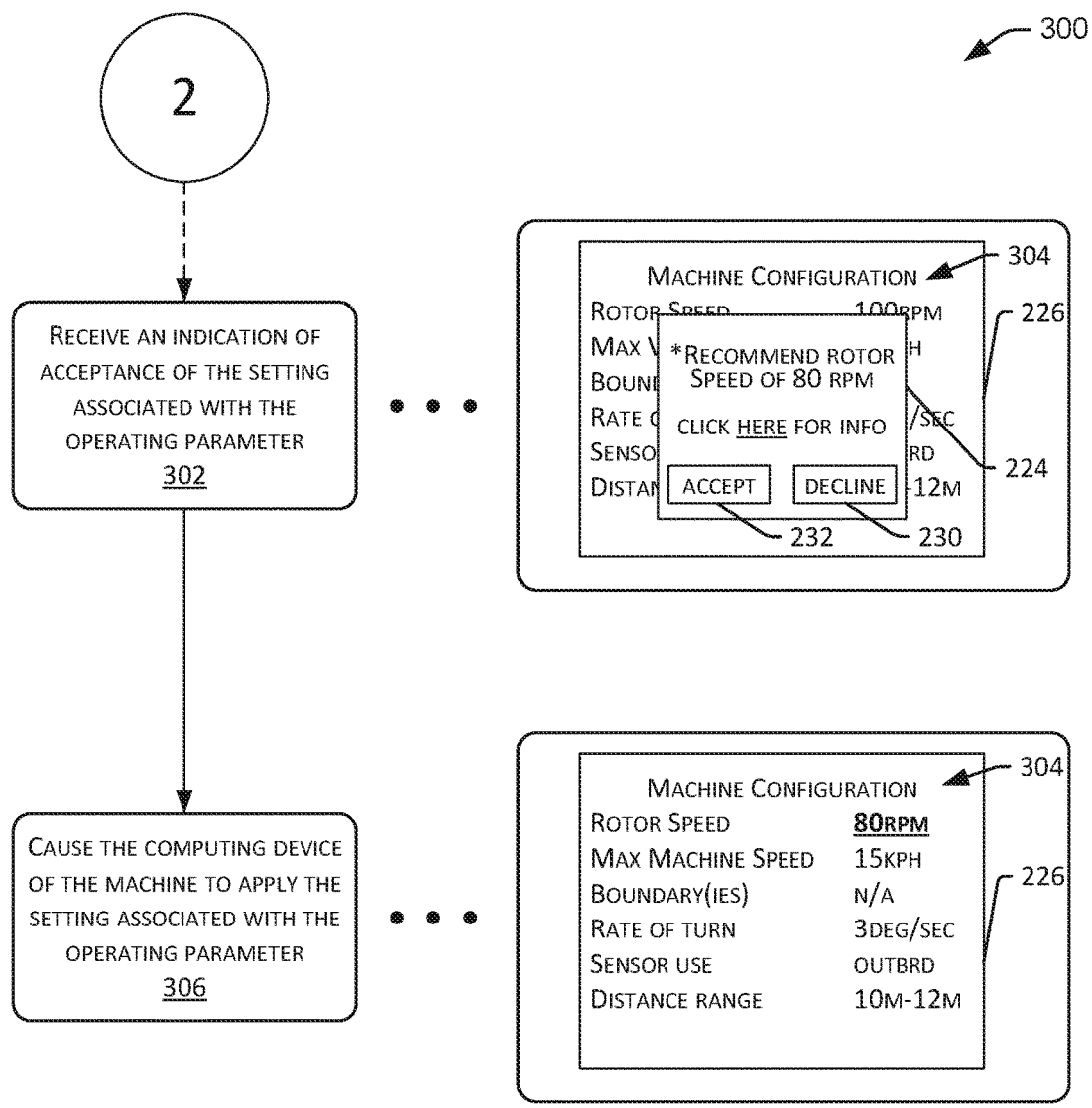
FIG. 3 includes a flow chart depicting a method for causing a computing device corresponding to a machine to associate a recommended setting for an operating parameter with the machine, in accordance with examples of this disclosure.

In some examples, the recommendation 224 includes an option to accept 232 the setting. As illustrated in FIG. 3, the process 300 includes, at operation 302, a processor receiving an indication of acceptance of the operating parameter. In some examples, the processor receives the indication of acceptance of the setting responsive to selection, by an operator, of the option to accept 232 the setting(s) associated with the operating parameter(s). In some examples, the computing device of the machine receives the selection (or an indication of selection) based on operator input via the display 226 and/or other input devices associated with the computing device.

In some examples, the computing device of the machine receives the indication of acceptance of the setting. In some examples, the recommendation platform receives the indication of acceptance via the computing device of the machine. In such examples, the computing device of the machine processes the operator input of the option to accept 232 and sends a message to the recommendation platform including the indication of acceptance.

In some examples, the computing device of the machine receives an indication of selection of the option to accept 232 (e.g., indication of acceptance) and displays or otherwise presents a machine configuration page 304 to enable the operator to input the recommended operating parameter. For example, the operator selects the option to accept 232 and subsequently adjust a rotor speed to 80 revolutions per minute (RPM) on the machine configuration page 304.

At operation 306, the processor causes the computing device of the machine to apply the setting associated with the operating parameter. In some examples, responsive to receiving the indication of selection of the option to accept 232, the computing device of the machine automatically apply the recommended setting. For example, the recommendation illustrated in FIG. 2 includes a recommended rotor speed of 80 revolutions per minute (80 RPM). Responsive to receiving an indication that the operator selects the option to accept a rotor speed of 80 RPM, the computing device of the machine causes the rotor speed to be set to 80 RPM during operation of the machine.

In some examples, responsive to receiving the indication of acceptance at operation 302, the recommendation platform sends an instruction to the computing device of the machine to apply the setting associated with the operating parameter. Based in part on the instruction, the computing device of the machine applies the recommended setting of 80 RPM, as illustrated in FIG. 3 on the machine configuration page 304.

In some examples, the recommendation platform stores the indication of selection of the option to accept 232 in a database, such as for a later analysis of production data (e.g., comparing expected production value to actual production value). In some examples, based at least in part on the analysis, a training component of the recommendation platform trains a data model to output settings associated with operating parameter recommendations based on the production data. For example, based on a determination that the production data met or exceeded expected production data, a training component of the recommendation platform trains one or more data models utilizing the sensor data and the production data as training data. The updated training increases a confidence in the data model in recommending the operating parameter in other environments with similar sensor data as that associated with an operating environment, such as environment 204.

Figure 4:
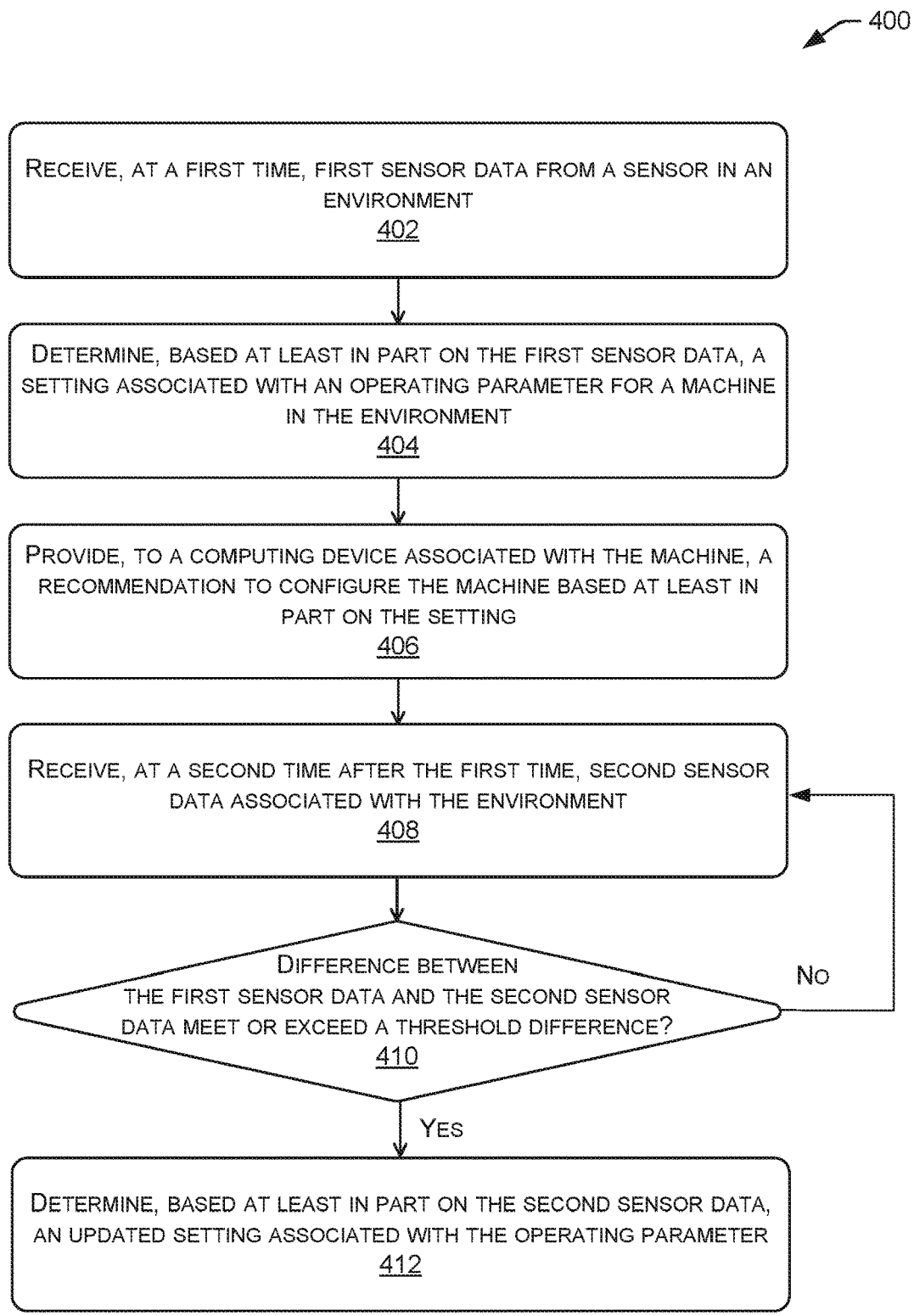
FIG. 4 is a flow chart depicting a method for modifying a setting associated with an operating parameter based in part on changing conditions in an environment, in accordance with examples of this disclosure.

FIG. 4 is a flow chart depicting a process 400 for modifying a setting associated with an operating parameter based in part on changing conditions in an environment, in accordance with examples of this disclosure. In some examples, the process 400 is performed by a computing device of a machine, such as computing device 102 of FIG. 1. In some examples, the process 400 is performed by a computing device associated with a recommendation platform, such as recommendation platform 108 of FIG. 1.

At operation 402, a processor associated with a computing device receives, at a first time, first sensor data from a sensor in an environment. As described above, the sensor includes a lidar sensor, radar sensor, camera (e.g., RGB, IR, intensity, depth, time of flight, etc.), audio sensor, ultrasonic transducer, sonar sensor, location sensor (e.g., global positioning system (GPS), compass, etc.), inertial sensor (e.g., inertial measurement units, accelerometers, magnetometers, gyroscopes, etc.), environment sensor (e.g., temperature sensors, humidity sensors, light sensors, pressure sensors, etc.), or the like. In some examples, the sensor includes a sensor that is permanently mounted in the environment. In some examples, the sensor includes a mobile sensor, such as that placed in the environment based on an operation of one or more machines therein. In some examples, the sensor includes a sensor associated with a machine, such as sensor(s) 106 and/or sensor(s) 112 of FIG. 1.

At operation 404, the processor determines, based at least in part on the first sensor data, a setting associated with an operating parameter of a machine in the environment. As discussed above, the setting associated with the operating parameter includes a speed associated with a component of the machine (e.g., rotor speed, etc.), a speed associated with the machine (e.g., forward speed, lateral speed, etc.), a first sensor to activate, a second sensor to deactivate, a depth of cut, a propel pressure, a propel speed, an engine load, a distance to maintain from another machine and/or object, a distance to maintain from an operating boundary, or the like.

In some examples, the processor determines the setting associated with the operating parameter based on sensor data and production data previously captured by machines operating in various environments. In some examples, the processor determines the setting associated with the operating parameter based on an optimized performance associated with the machines operating in environments similar to the environment in which the machine operates. In such examples, the processor determines the performance optimization based on a plurality of sensor data and a plurality of production data associated with a plurality of machines in similar environments.

In some examples, the processor determines the setting associated with the operating parameter based on a statistical analysis of the plurality of sensor data and production data associated with the machines that previously operated in similar environments. In some examples, the processor determines the setting associated with the operating parameter utilizing machine learning techniques. In such examples, the computing device (e.g., computing device of the machine or a server computing device) includes one or more data models trained utilizing training data (e.g., including the plurality of sensor data, settings associated with operating parameters previously set on a machine, and the production data) to output one or more settings associated with operating parameters to optimize a performance of a machine.

At operation 406, the processor provides, to a computing device associated with the machine, a recommendation to configure the machine based at least in part on the setting. In some examples, a recommendation component of the computing device associated with the machine, such as recommendation component 132 of FIG. 1, provides the recommendation to a configuration component, such as configuration component 128 of FIG. 1. In at least one example, the server computing device associated with a recommendation platform provides the recommendation to the computing device associated with the machine. In some examples, the server computing device sends the recommendation in a message. In some examples, the message includes an instruction to present the recommendation on a display associated with the computing device of the machine, such as to enable an operator to view the recommendation. In various examples, the operator accepts or declines to apply the setting associated with the operating parameter to the machine.

In examples in which the machine is autonomous or semi-autonomous, the computing device of the machine automatically applies the recommended setting based on receipt of the recommendation to configure the machine therewith.

At operation 408, the processor receives, at a second time after the first time, second sensor data associated with the environment. The processor receives the second sensor data from a same or a different sensor as the first sensor data. In some examples, the second sensor data includes a same and/or a different type of sensor data (e.g., data received from a same or a different type of sensor). In at least one example, the second sensor data and the first sensor data include data of at least one of the same type of sensor data. For example, the first sensor data includes a first temperature and the second sensor data includes a second temperature.

At operation 410, the processor determines whether a difference between the first sensor data and the second sensor data meets or exceeds a threshold difference. The threshold may be based at least in part on the type of sensor data. For example, a temperature is associated with a first threshold difference and humidity is associated with a second threshold difference. The threshold may be determined based on experimental data, testing, or the like. In some examples, the thresholds are based on location data and/or road data associated with the machine. For example, material properties associated with asphalt are affected more by temperature than material properties associated with concrete. Thus, a threshold difference in temperature associated with grinding asphalt is a lower threshold than a threshold difference in temperature associated with grinding concrete. For another example, material properties associated with a first type of aggregate (e.g., limestone) require a first threshold difference based on a detection of ice and/or freezing temperatures and material properties associated with a second type of aggregate (e.g., river rock) require a second threshold difference based on the detection of ice and/or freezing temperatures. For yet another example, a threshold difference in a grade of a road is associated with a different forward speed of the machine. As such, based on a determination that the grade of the road has changed at or above the threshold amount, the processor recommends modifying the forward speed of the machine.

In some examples, the processor additionally or alternatively determines whether the second sensor data meets or exceeds a threshold value associated with a type of sensor data associated therewith. In such examples, the threshold value is based on the type of sensor data (e.g., location data, environmental data, road data, object data, etc.). The processor determines the threshold value based on experimental data, testing, or the like.

Based on a determination that the difference does not meet or exceed the threshold difference (or threshold value) ("No" at operation 410), the processor receives additional sensor data at a later time, such as that described with regard to operation 408. In some examples, the computing device continuously and/or periodically receives and/or processes sensor data to determine whether the sensor data exceeds the threshold difference and/or the threshold value.

Based on a determination that the difference meets or exceeds the threshold difference (or threshold value) ("Yes" at operation 410), at operation 412, the processor determines, based at least in part on the second sensor data, an updated setting associated with the operating parameter for the machine. In some examples, the updated operating parameter includes a different value associated with an operating parameter that is currently set on the machine. In such examples, the processor determines the currently set operating parameters to determine the updated operating parameter. For example, the operating parameter recommended based in part on a first temperature in an operating environment includes a first rotor speed. Based on a determination that a second temperature exceeds a threshold value and/or exceeds a threshold difference from the first temperature, the processor determines a second rotor speed.

In some examples, the updated setting parameter includes a value associated with an operating parameter that was not previously recommended (e.g., newly recommended operating parameter). For example, at a first time, a cold planer operating in the middle of a lane of a road operates using default sensors, including a sensor located on a side plate. The processor receives first sensor data and does not make a recommendation related to activating or deactivating any sensors. At a second time, the processor determines, based on second sensor data, that the cold planer is operating within a threshold distance of an operating boundary such that the sensor associated with the side plate is over the operating boundary. Based on the determination of being within the threshold distance of the operating boundary, the processor generates a recommendation to deactivate the sensor on the side plate and activate a sensor located inboard of the side plate.

Figure 5:
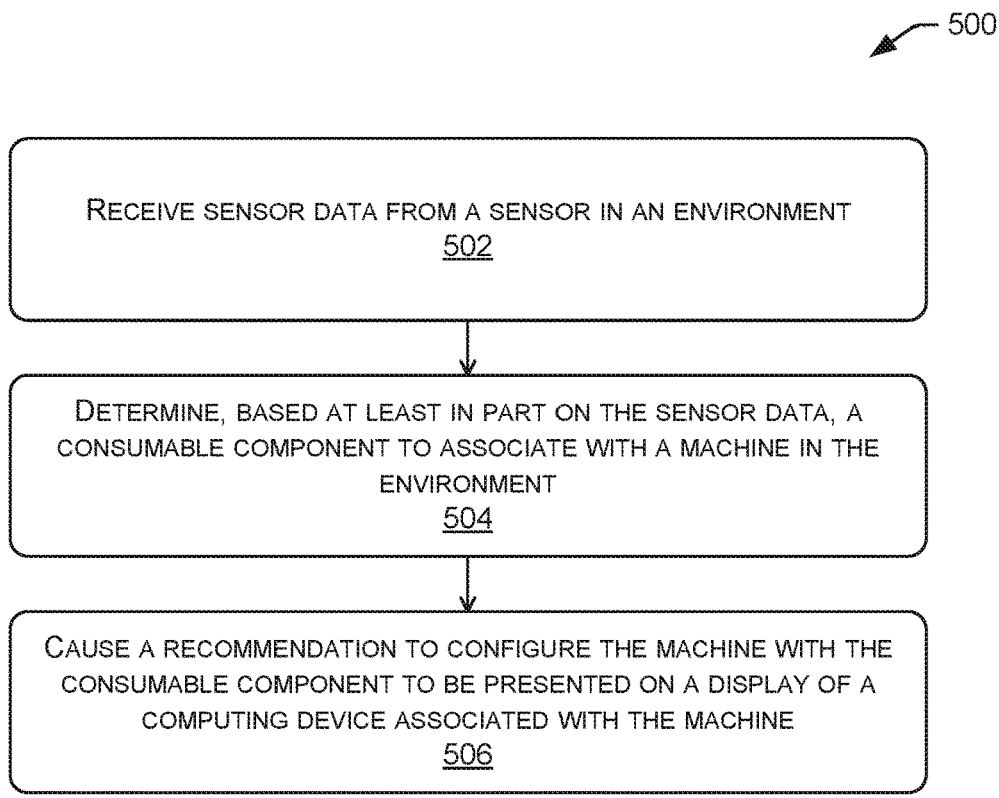
FIG. 5 is a flow chart depicting a method for recommending a consumable component to associate with a machine in an environment, in accordance with examples of this disclosure.

FIG. 5 is a flow chart depicting a process 500 for recommending a consumable component to associate with a machine in an environment, in accordance with examples of this disclosure. In some examples, the process 500 is performed by a computing device of a machine, such as computing device 102 of FIG. 1. In some examples, the process 500 is performed by a computing device associated with a recommendation platform, such as recommendation platform 108.

At operation 502, the computing device receives sensor data from a sensor in an environment. As described above, the sensor includes a lidar sensor, radar sensor, camera (e.g., RGB, IR, intensity, depth, time of flight, etc.), audio sensor, ultrasonic transducer, sonar sensor, location sensor (e.g., global positioning system (GPS), compass, etc.), inertial sensor (e.g., inertial measurement units, accelerometers, magnetometers, gyroscopes, etc.), environment sensor (e.g., temperature sensors, humidity sensors, light sensors, pressure sensors, etc.), or the like. In some examples, the sensor includes a sensor that is permanently mounted in the environment. In some examples, the sensor includes a mobile sensor, such as that placed in the environment based on an operation of one or more machines therein. In some examples, the sensor includes a sensor associated with a machine, such as sensor(s) 106 and/or sensor(s) 112 of FIG. 1.

At operation 504, the computing device determines, based at least in part on the sensor data, a consumable component to associated with the machine in the environment. The consumable components include parts or other commodities used by a machine that are intended to be used up during operation. Consumable components include a type of cutting tooth, a size and/or type of blade, an amount of water to be loaded on the machine, and the like. For example, a computing device determines, based on a high temperature in an operating environment determined based on sensor data, that 150 gallons of water may be required to cool components of a machine. Based on the determination, the computing device generates a recommendation to configure the machine with 150 gallons of water prior to operation of the vehicle in the environment. For another example, the computing device determines, based on a location (e.g., geographic region) associated with the machine, that a road surface includes a river rock aggregate. Based on the river rock aggregate, the computing device determines that a particular carbite tooth should be incorporated into the machine (a cold planer) to optimize an operating performance thereof.

At operation 506, the computing device causes a recommendation to configure the machine with the consumable component to be presented on a display of a computing device associated with the machine. In some examples, the recommendation may include an initial recommendation to associate a particular amount of a consumable component with the machine at a first time (e.g., prior to operation of the machine at the worksite). In some examples, the recommendation includes a recommendation to add a particular consumable component, such as based on conditions that have changed at the worksite. For example, a computing device determines that a temperature at a worksite has increased above a threshold and that a greater amount of water will be beneficial for the operation of the machine. The computing device may cause a recommendation to add water to a reservoir of the machine (and/or adjust a flow rate thereof) to be presented on the display of the computing device associated with the machine.

In some examples, the recommendation is presented on a computing device of the machine, such as computing device 102 of FIG. 1. In some examples the recommendation is presented on an additional computing device associated with the machine, such as additional computing device 130 of FIG. 1. The additional computing device includes a computing device associated with a worksite manager, a maintenance employee associated with the machine, an operator of the machine, and/or others who may be responsible for a configuration of consumable components in the machine. For example, the recommendation component causes the recommendation to be presented on a computing device associated with a maintenance department associated with the machine. The recommendation may be presented as a pop-up notification via an application on the computing device, a text message, electronic mail message, or any other type of notification system.

Figure 6:
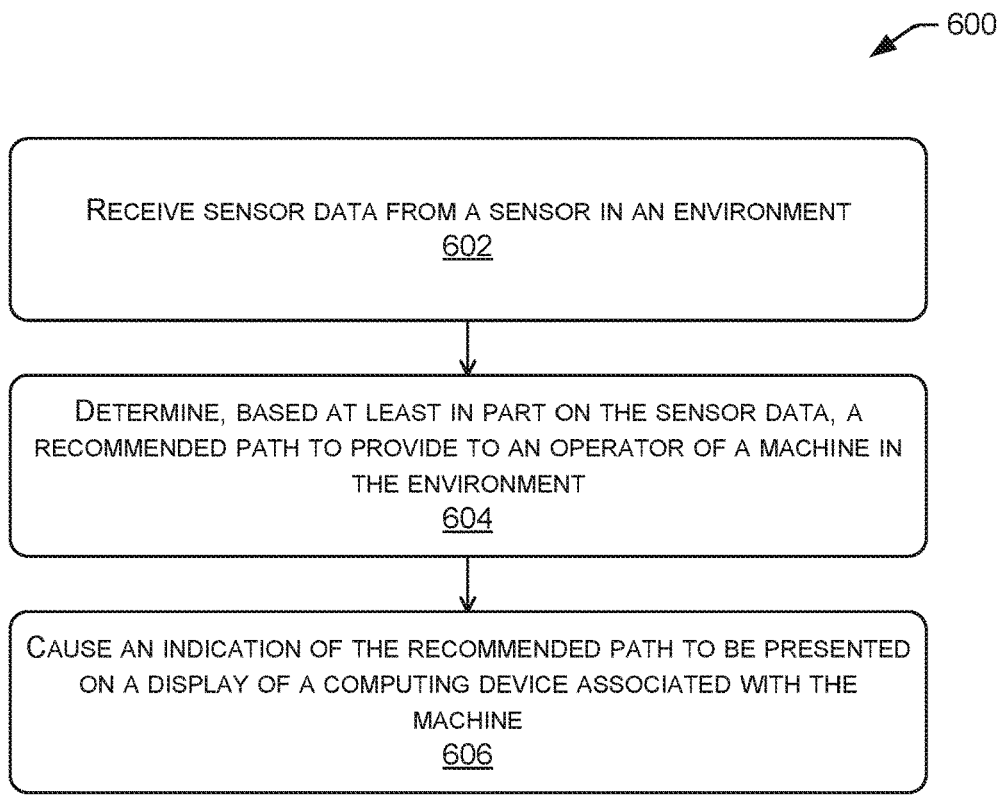
FIG. 6 is a flow chart depicting a method for surfacing one or more recommended paths for a machine to travel in an environment, in accordance with examples of this disclosure.

FIG. 6 is a flow chart depicting a process 600 for surfacing one or more recommended paths for a machine to travel in an environment, in accordance with examples of this disclosure. In some examples, the process 600 is performed by a computing device of a machine, such as computing device 102 of FIG. 1. In some examples, the process 600 is performed by a computing device associated with a recommendation platform, such as recommendation platform 108.

At operation 602, the computing device receives sensor data from a sensor in an environment. As described above, the sensor includes a lidar sensor, radar sensor, camera (e.g., RGB, IR, intensity, depth, time of flight, etc.), audio sensor, ultrasonic transducer, sonar sensor, location sensor (e.g., global positioning system (GPS), compass, etc.), inertial sensor (e.g., inertial measurement units, accelerometers, magnetometers, gyroscopes, etc.), environment sensor (e.g., temperature sensors, humidity sensors, light sensors, pressure sensors, etc.), or the like. In some examples, the sensor includes a sensor that is permanently mounted in the environment. In some examples, the sensor includes a mobile sensor, such as that placed in the environment based on an operation of one or more machines therein. In some examples, the sensor includes a sensor associated with a machine, such as sensor(s) 106 and/or sensor(s) 112 of FIG. 1.

At operation 604, the computing device determines, based at least in part on the sensor data, a recommended path (e.g., operating instructions) to provide to an operator of the machine in the environment. In various examples, the recommended path is based at least in part on one or more operating boundaries associated with the environment. In some examples, the computing device of the machine and/or the recommendation platform stores operating boundary data associated with the environment. In such examples, the operating boundary data includes one or more maps with boundaries depicted thereon or associated therewith, such as to identify a boundary of an operating area for the machine to stay within during operation.

The recommended path includes a direction of travel associated with maximizing an effectiveness of the machine operating in the environment. In some examples, the direction of travel additionally maximizes the effectiveness of machine components with respect to the boundary. For example, a machine grinding a surface operates proximate a boundary. The recommended path includes a direction of travel associated with the boundary to optimize performance of the machine, such as by ensuring that an area outside the surface (beyond the boundary) is not ground by the machine.

At operation 606, the computing device causes an indication of the recommended path to be presented on a display of a computing device associated with the machine. In some examples, the indication of the recommended path is presented via a user interface of the computing device associated with the machine. In some examples, the recommended path includes a heading and/or range of headings for an operator to maintain. In some examples, the indication of the recommended path includes an arrow indicating the recommended path or heading, a highlight of one or more headings to maintain, such as on heading indicator or directional gyroscope, or the like. In examples in which the machine is autonomous or semi-autonomous, responsive to receiving the recommended path, the computing device of the machine controls the machine according to the recommended path.

Additionally, in some examples, the computing device causes an alert to be presented and/or be emitted (e.g., aural warning, visual warning on a display, etc.) to the operator via the user interface indicating that a current heading and/or heading trend causes the machine to deviate from the recommended path. In such examples, the alert warns the operator to correct the heading. In some examples, the alert (e.g., warning) is presented (or emitted) based on the operator inputting an indication of acceptance of the recommended path. In such examples, the alert system is activated based on an acceptance by the operator of the recommended path.

Figure 7:
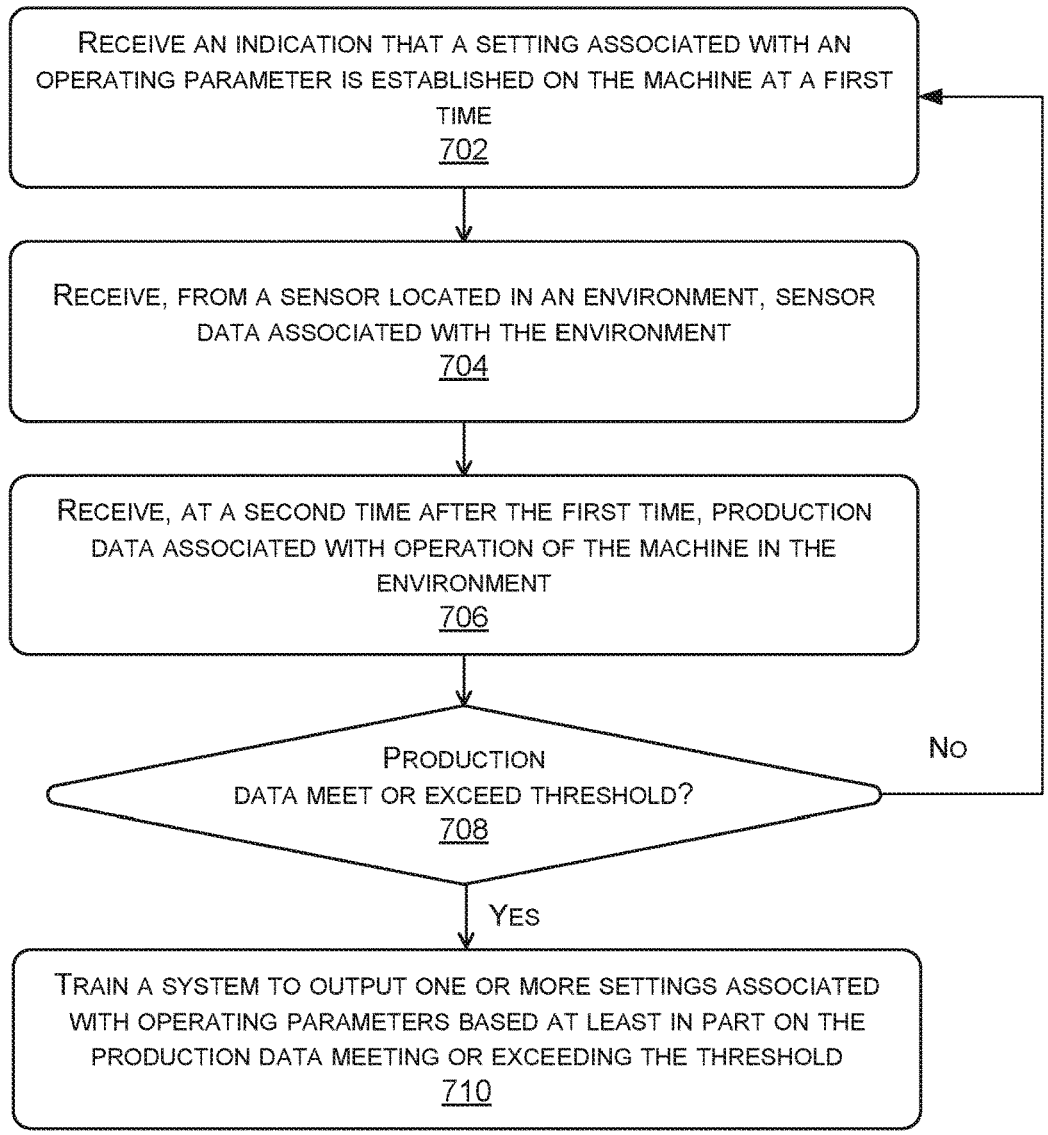
FIG. 7 is a flow chart depicting a method for training a system to output one or more settings associated with one or more operating parameters of machine to optimize performance based on production data, in accordance with examples of this disclosure.

FIG. 7 is a flow chart depicting a process 700 for training a system to output one or more operating parameters for a machine to optimize performance based on production data, in accordance with examples of this disclosure. In some examples, the process 700 is performed by a computing device of a machine, such as computing device 102 of FIG. 1. In some examples, the process 700 is performed by a computing device associated with a recommendation platform, such as recommendation platform 108.

At operation 702, the computing device receives an indication that a setting associated with an operating parameter is established on the machine at a first time. The machine includes a cold planer, a haul truck, a dozer, an excavator, an articulated truck, a compactor, a motor grader, a track loader, a wheel loader, or any other type of machine (e.g., paving equipment, mining equipment, construction equipment, etc.) configured to operate in an environment. The machine includes a manned machine (e.g., operator manually controlling parameters and operation), a semi-autonomous machine, or an autonomous machine. As discussed above, the setting associated with the operating parameter includes a speed associated with a component of the machine (e.g., rotor speed, etc.), a speed associated with the machine (e.g., forward speed, lateral speed, etc.), a first sensor to activate, a second sensor to deactivate, a depth of cut, a propel pressure, a propel speed, an engine load, a distance to maintain from another machine and/or object, a distance to maintain from an operating boundary, or the like.

At operation 704, the computing device receives, from a sensor located in an environment, sensor data associated with the environment. As described above, the sensor includes a lidar sensor, radar sensor, camera (e.g., RGB, IR, intensity, depth, time of flight, etc.), audio sensor, ultrasonic transducer, sonar sensor, location sensor (e.g., global positioning system (GPS), compass, etc.), inertial sensor (e.g., inertial measurement units, accelerometers, magnetometers, gyroscopes, etc.), environment sensor (e.g., temperature sensors, humidity sensors, light sensors, pressure sensors, etc.), or the like. In some examples, the sensor includes a sensor that is permanently mounted in the environment. In some examples, the sensor includes a mobile sensor, such as that placed in the environment based on an operation of one or more machines therein. In some examples, the sensor includes a sensor associated with a machine, such as sensor(s) 106 and/or sensor(s) 112 of FIG. 1.

At operation 706, the computing device receives, at a second time after the first time, production data associated with operation of the machine in the environment. The production data includes an amount of work produced or completed by a machine over a certain number of hours and/or per fuel burned. For example, production data associated with a cold planer includes an amount of road surface removed (e.g., ground and transferred to a dump truck, such as machine) over a given period of time (e.g., per hour, over a 10-hour work day, etc.). For another example, production data associated with the cold planer includes an amount of road surface removed per gallons of fuel burned. For yet another example, production data associated with a paver includes a length of road surface paved over a given period of time.

At operation 708, the computing device determines whether the production data meets or exceeds a threshold value. The threshold is determined based on experimental data, testing, or the like. In some examples, the threshold is based on location data and/or road data associated with the machine. For example, a cold planer grinds and moves a larger amount of an asphalt road surface than a concrete road surface in a fixed amount of time. As such, a first threshold associated with the asphalt road surface is higher than a second threshold associated with the concrete.

In some examples, the threshold is determined based on the environmental data (e.g., temperature, humidity, precipitation, etc.). For example, a cold planer is able to grind and move a larger amount of an asphalt road surface in temperatures between 38 degrees Fahrenheit (° F.) and 89° F. than in temperatures above 85° F. and below 37° F. As such, a first threshold is associated with detected temperatures between 38-85° F., a second threshold is associated with detected temperatures above 85° F., and/or a third threshold is associated with detected temperatures below 37° F.

Based on a determination that the production data does not meet or exceed the threshold value ("No" at operation 708), the computing device receives another indication that an operating parameter is established on the machine at a particular time, such as that described with regard to operation 702.

Based on a determination that the production data meets or exceeds the threshold value ("Yes" at operation 708), at operation 710, the computing device trains a system to output one or more settings associated with operating parameters based at least in part on the production data meeting or exceeding the threshold. In some examples, the computing device trains the system utilizing machine learning techniques, statistical analysis, or any other means by which a system may be trained to output the operating parameter(s) based on input associated with sensor data, established operating parameters on the machine, and/or production data associated with the machine.

Figure 8:
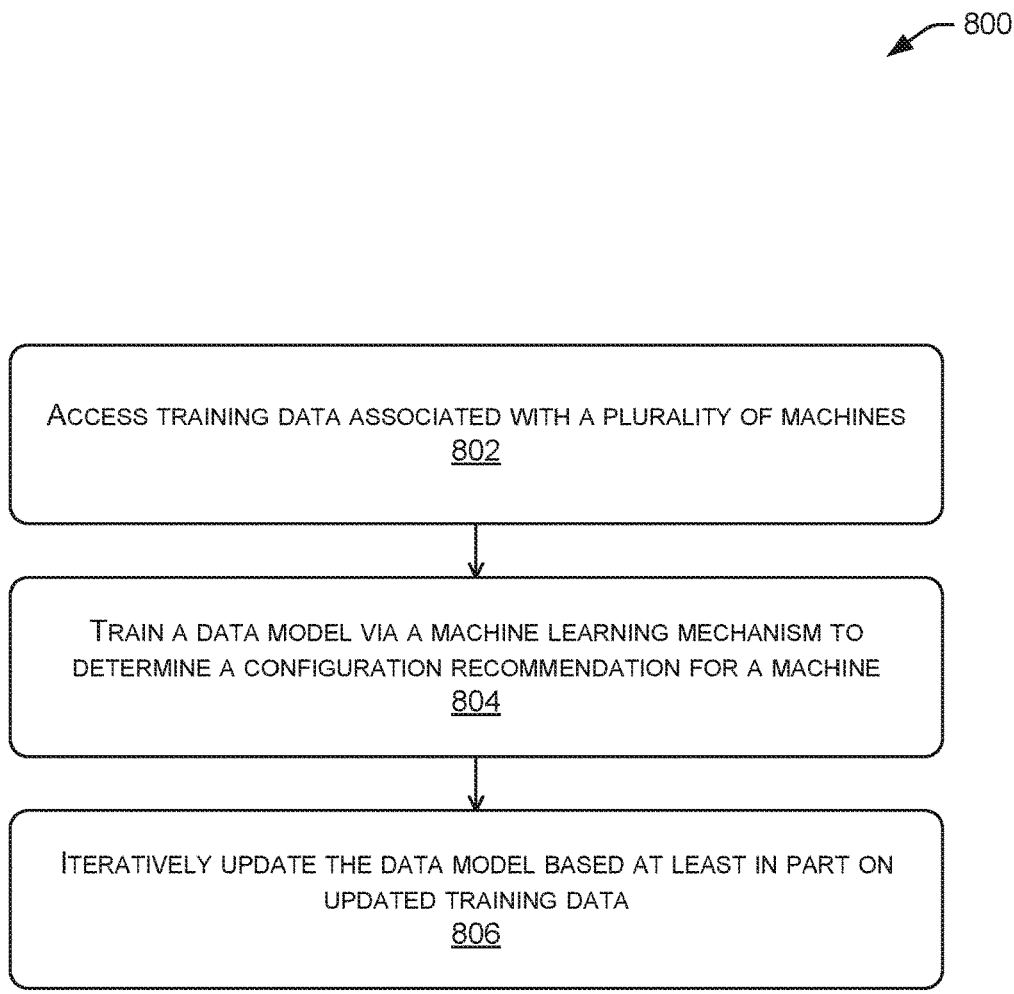
FIG. 8 is a flow chart depicting a method for training a data model utilizing machine learning techniques to output one or more settings associated with one or more operating parameters of a machine to optimize performance, in accordance with examples of this disclosure.

FIG. 8 is a flow chart depicting a process 800 for training a data model utilizing machine learning techniques to output one or more operating parameters for a machine to optimize performance, in accordance with examples of this disclosure. In some examples, the process 800 is performed by a computing device of a machine, such as computing device 102 of FIG. 1 (e.g., by training component 134). In some examples, the process 800 is performed by a computing device associated with a recommendation platform, such as recommendation platform 108 (e.g., by training component 117).

At operation 802, the training component accesses training data associated with a plurality of machines. As described above, the training component trains one or more data models leveraging machine learning mechanisms. In at least one example, the training component accesses the training data. The training data includes sensor data, settings associated with operating parameters, and production data associated with the plurality of machines operating in a plurality of environments, as described above. For example, the training data includes data associated with an optimized performance of a machine in an environment (e.g., production data above a threshold value). The training data includes sensor data associated with the environment, settings associated with operating parameters set by the machine in the environment, and/or the production data (e.g., an amount of road surface moved per hour and/or per a given amount of fuel burned (e.g., per 100 gallons, etc.)).

In some examples, the training data is based in part on operator feedback with regard to operation of the machine in the environment. In some examples, the operator feedback is based in part on an approval or denial of the recommended operating parameter, such as that illustrated and described with regard to FIGS. 2 and 3. In some examples, the operator feedback includes an input regarding machine operation (e.g., smooth tracking along a surface, too slow for operating environment, recommended headings not accurate, or the like).

At operation 804, the training component trains a data model via a machine learning mechanism to determine a setting associated with an operating parameter for a machine. The setting associated with the operating parameter includes a setting determined to optimize a performance of the machine in the environment. The training component trains the data model based on a plurality of training data items such that, given a new input of sensor data, operating parameters, and/or production data associated with a machine, the data model outputs a setting associated with an operating parameter to optimize the performance of the machine.

In at least one example, the training component utilizes a machine learning mechanism to train the data model. In such an example, the training component trains the data model using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In various examples, the operating parameter determination is based on statistical analyses of machine performance. For instance, the training component utilizes techniques, such as k-means clustering, etc. to determine operating parameters most often used by similar machines operating in similar environments, the similar machines associated with production data that meets or exceeds a threshold production value (e.g., average tonnage/hour, average tonnage/fuel used, etc.).

At operation 806, the training component iteratively updates the data model based on updated training data. In at least one example, the training component receives updated training data. For instance, training component receives updated training data after a lapse of a predetermined period of time, at a particular frequency, etc. The updated training data includes updated sensor data, operating parameters, production data, or the like. Furthermore, the updated training data indicates whether a previously determined operating parameter output by the data model was accurate. In at least one example, training component receives updated training data and re-trains the data model based at least partly on the updated training data.

Figure 9:
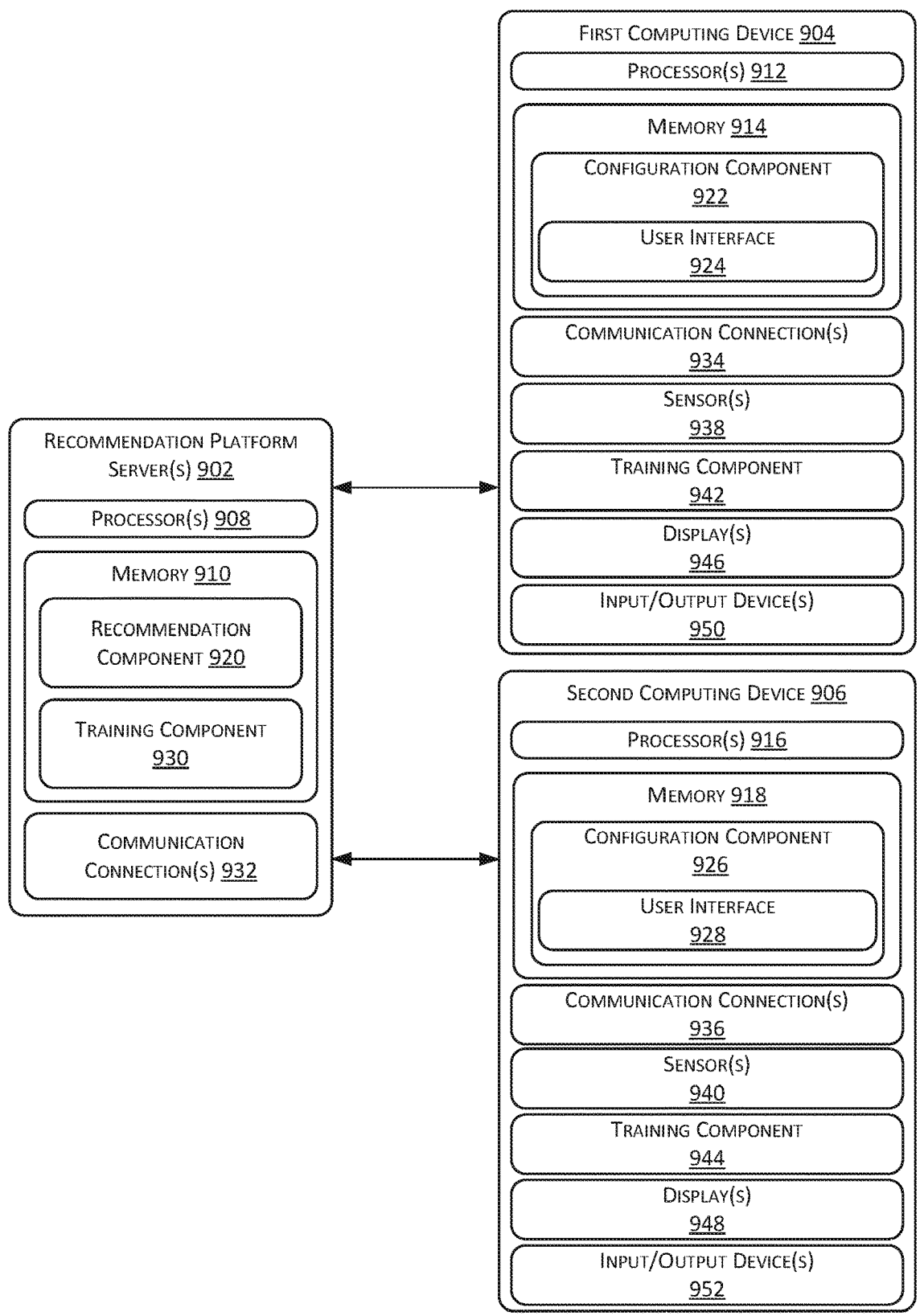
FIG. 9 is an illustration of an example system for implementing the techniques described herein.

FIG. 9 is an illustration of an example system 900 for implementing the techniques described herein. For example, FIG. 9 illustrates example computing devices including recommendation platform server(s) 902, one or more first computing devices 904, and one or more second computing devices 906, that interact over a network, such as network 120 of FIG. 1. By way of example and not limitation, the recommendation platform server(s) 902 may be representative of servers used to implement the recommendation platform system 100, the first computing device(s) 904 may be representative of the computing device 102 associated with the machine 104, and the second computing device(s) 906 may be representative of the computing device 118 associated with the second machine 110 and/or additional computing device 130 associated with the machine 104 and/or the second machine 110.

The recommendation platform server(s) 902 may include one or more individual servers or other computing devices that may be physically located in a single central location or may be distributed at multiple different locations. The recommendation platform server(s) 902 may be hosted privately by an entity administering all or part of a recommendation network (e.g., a construction company, a retailer, manufacturer, etc.), or may be hosted in a cloud environment, or a combination of privately hosted and cloud hosted services.

Each of the computing devices described herein include one or more processors and/or memory. Specifically, in the illustrated example, recommendation platform server(s) 902 include one or more processors 908 and memory 910, first computing device(s) 904 include one or more processors 912 and memory 914, and second computing device(s) 906 includes one or more processors 916 and memory 918. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory (e.g., memories 910, 914, 918) may comprise one or more non-transitory computer-readable media and may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

As shown in FIG. 9, recommendation platform server(s) 902 include a recommendation component 920, first computing device(s) 904 includes configuration component 922 with a user interface 924, and second computing device(s) 906 includes configuration component 926 with a user interface 928 that enables interaction of configuration recommendations (e.g., consumable components, operating parameters, recommended path, etc.) to the computing devices from the recommendation platform server(s) 902. For example, the recommendation platform receives sensor data associated with an environment in which a first machine associated with the first computing device 904 and a second machine associated with the second computing device 906 operate. The recommendation platform determines a setting associated with an operating parameter to recommend for association with the first machine and/or the second machine. The recommendation platform server(s) 902 causes the recommended setting associated with the operating parameter to be displayed or otherwise presented via the user interface 924 of the first computing device 904 and the user interface 928 of the second computing device 906. For another example, the recommendation platform server(s) 902 determines a consumable component to associate with a first machine. The recommendation platform server(s) 902 causes a recommendation including the consumable component to be displayed or otherwise presented via the user interface 928 associated with the second computing device 906 (an additional computing device associated with the machine.

As illustrated by recommendation component 132 of FIG. 1, the first computing device 904 and/or the second computing device 906 may additionally or alternatively be configured to determine one or more configuration recommendations based on sensor data. In such examples, the first computing device 904 and/or the second computing device 906 include recommendation components similar to recommendation component 920 of the recommendation platform server(s) 902.

FIG. 9 further illustrates recommendation platform server(s) 902 as including training component 930. The training component 930 may be configured to train one or more data models to output one or more configuration recommendations (e.g., consumable components, operating parameters, recommended paths, etc.) based on sensor data, current operating parameters, and/or production data associated with machines, such as that described above with regard to FIGS. 7 and 8.

As shown in FIG. 9, recommendation platform server(s) 902 include communications connection(s) 932, first computing device(s) 904 include communications connection(s) 934, and second computing device(s) 906 include communications connection(s) 936 that enable communication between at least the recommendation platform server(s) 902 and one or more of the first computing device(s) 904, and the second computing device(s) 906.

The communication connection(s) 932, 934, and/or 936 include physical and/or logical interfaces for connecting recommendation platform server(s) 902, first computing device(s) 904, and/or second computing device(s) 906 to another computing device or a network, such as network(s) 120. For example, the communications connection(s) 932, 934, and/or 936 can enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with the other computing device(s).

As illustrated in FIG. 9, the first computing device(s) 904 include sensor systems(s) 938, and second computing device(s) 906 include sensor system(s) 940. The sensor systems 938 and 940 include lidar sensors, radar sensors, cameras (e.g., RGB, IR, intensity, depth, time of flight, etc.), audio sensors, ultrasonic transducers, sonar sensors, location sensors (e.g., global positioning system (GPS), non-GPS based location-based sensors, compass, etc.), inertial sensors (e.g., inertial measurement units, accelerometers, magnetometers, gyroscopes, etc.), environment sensors (e.g., temperature sensors, humidity sensors, light sensors, pressure sensors, etc.), etc.

In some examples, the first computing device 904 includes training component 942 and/or the second computing device 906 includes training component 944. The training components 942 and/or 944, similar to training component 930, may be configured to train one or more data models of a configuration component on the respective devices 904 and/or 906 to output one or more configuration recommendations based on sensor data, current operating parameters, and/or production data associated with machines, such as that described above with regard to FIGS. 7 and 8. In such examples, the first computing device 904 and/or the second computing device 906 may be configured to train the data models during operating of the associated machines.

As described throughout, the first computing device 904 includes displays 946 and/or the second computing device 906 includes displays 948. The displays 946 present configuration recommendations to an associated operator and/or user of the respective computing device 904 and/or 906, such as via user interface 924 and/or user interface 928. Depending on the type of computing device(s) used as the first computing device 904 and/or the second computing device 906, the displays 946 and/or 948 may employ any suitable display technology. For example, the displays 946 and/or 948 may be a liquid crystal display, a plasma display, a light emitting diode display, an OLED (organic light-emitting diode) display, an electronic paper display, or any other suitable type of display able to present digital content thereon. In some examples, the displays 946 and/or 948 may have a touch sensor associated with the displays 946 and/or 948 to provide a touchscreen display configured to receive touch inputs for enabling interaction with a graphic interface (e.g., user interface 924 and/or 928) presented on the displays 946 and/or 948. Accordingly, implementations herein are not limited to any particular display technology. Alternatively, in some examples, the first computing device 904 and/or the second computing device 906 may not include the displays 946 and/or 948, and information may be presented by other means, such as aurally.

As illustrated in FIG. 9, the first computing device 904 includes one or more input/output devices 950 and the first computing device 906 includes one or more input/output devices 952. The input/output devices 950 and/or 952 may include various user interface controls (e.g., buttons, joystick, keyboard, mouse, touch screen, etc.), audio speakers, microphones, connection ports and so forth, to enable an operator of the machine and/or user of the respective device to interact with the respective computing device 904 and/or 906.

While FIG. 9 is provided as an example system 900 that can be used to implement techniques described herein, the techniques described and claimed are not limited to being performed by the system 900, nor is the system 900 limited to performing the techniques described herein.

INDUSTRIAL APPLICABILITY

The present disclosure provides systems and methods for providing configuration recommendations for a machine 104 operating in an environment, such as environment 204. In particular, the systems and methods of the present disclosure receive sensor data captured by sensors 106, 112, and/or 114 in an environment. The various systems and methods described herein determine one or more configuration recommendations based on the sensor data (e.g., operation 220 and/or 504). In some examples, the configuration recommendations include settings associated with operating parameters of the machine (e.g., operation 220, 404, 412). In some examples, the configuration recommendations include consumable components (e.g., operation 504) to be used on the machine. In some examples, the configuration recommendations include a recommended path for the machine to travel through the environment (e.g., operation 604), or the like.

The configuration recommendations may reduce a workload associated with an operator of the machine. For example, an operator of the machine observes a display with a recommended path for the machine to travel and orients the machine according to the recommended path. In such an example, the operator does not have to determine a path to take based on the surroundings. The configuration recommendations may additionally optimize performance of the machine in the environment. For example, the recommended path presented to the operator may include a most efficient path to travel in order to grind a maximum amount of a road surface in a minimum number of passes (or a minimum amount of time). Accordingly, the present disclosure improves the operation of the machine 104, as well as overall system efficiency.

While aspects of the present disclosure have been particularly shown and described with reference to the embodiments above, it will be understood by those skilled in the art that various additional embodiments are contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system, comprising:
   one or more processors; and
   one or more computer-readable media storing instructions that, when executed by the one or more processors, cause the one or more processors to perform operations comprising:
      receiving first sensor data generated by a first sensor, the first sensor being carried by a first machine performing a task at a worksite, and the first sensor data being indicative of a condition of the worksite;
      receiving second sensor data generated by a second sensor, the second sensor being of a different type than the first sensor, and being carried by a second machine disposed proximate the first machine;
      generating, based at least in part on the first sensor data and the second sensor data,
         a first recommended setting corresponding to an operating parameter of the first machine, wherein the first recommended setting is generated based on a plurality of production data associated with a plurality of machines, and
         a second recommended setting corresponding to an operating parameter of the second machine;
      causing a display of the first machine to provide a recommendation, the recommendation indicating at least the first recommended setting;
      modifying operation of at least one of the first machine in accordance with the first recommended setting, or the second machine in accordance with the second recommended setting, wherein modifying operation of the at least one of the first machine or the second machine changes interaction between the first machine and the second machine during performance of the task;
      receiving, from a computing device of the first machine at a first time, an indication that a first setting of the first machine corresponding to the operating parameter of the first machine has been changed to a second setting based at least in part on the recommendation;
      receiving, from the computing device of the first machine at a second time after the first time, first machine production data associated with at least the first machine performing the task at the worksite, wherein the first machine production data quantifies an amount of work produced by the first machine between the first time and the second time;
      receiving third sensor data generated by the first sensor carried by the first machine, wherein the third sensor data is indicative of the first machine performing the task in accordance with the second setting;
      determining a statistical correlation between the third sensor data and the first machine production data; and
      generating a third recommended setting, corresponding to the operating parameter of the first machine, based on the statistical correlation.

2. The system of claim 1, wherein the first recommended setting is determined based at least in part on machine learning techniques.

3. The system of claim 1, wherein
   wherein modifying operation of the at least one of the first machine or the second machine comprises causing the computing device of the first machine to modify a current setting of the first machine corresponding to the operating parameter of the first machine based at least in part on the first recommended setting.

4. The system of claim 1, wherein the operations further comprise:
   storing the first machine production data.

5. The system of claim 1, wherein the operating parameter of the first machine comprises at least one of:
   a rotor speed;
   a speed of the first machine;
   a sensor to activate;
   a sensor to deactivate;
   a depth of cut;
   a first distance to maintain between the first machine and the second machine; or
   a second distance to maintain from an operating boundary.

6. The system of claim 1, wherein the recommendation comprises a first recommendation associated with the first time, and the display comprises a first display, the operations further comprising:
determining, based at least in part on the first sensor data and at a third time prior to the first time and prior to initiating an operation of the first machine, an amount of a consumable component for use by the first machine; and
causing the first display of the first machine or a second display corresponding to another computing device associated with the first machine to provide a second recommendation, the second recommendation indicting the amount of the consumable component to include on the first machine.

7. The system of claim 1, the operations further comprising:
determining that the first machine production data satisfies a data threshold; and
based on determining that the first machine production data satisfies the threshold, updating a machine learning model using:
the first machine production data,
the first recommended setting, and
the third sensor.

8. A method, comprising:
receiving, from a first sensor disposed at a worksite, first sensor data associated with a first time and indicative of a condition of the worksite, wherein a first machine is performing a task at the worksite, and a second machine is disposed proximate the first machine at the worksite;
receiving, from a second sensor disposed at the worksite, second sensor data indicative of operation of at least one of the first machine or the second machine during performance of the task at the worksite, the second sensor being of a different type than the first sensor;
generating, based at least in part on the first sensor data and the second sensor data,
a first recommended setting corresponding to an operating parameter of the first machine, and
a second recommended setting corresponding to an operating parameter of the second machine;
causing a display of the first machine to provide a first recommendation, the first recommendation indicating at least the first recommended setting;
modifying operation of at least one of the first machine in accordance with the first recommended setting, or the second machine in accordance with the second recommended setting, wherein modifying operation of the at least one of the first machine or the second machine changes interaction between the first machine and the second machine during performance of the task;
receiving, from the first sensor, third sensor data associated with:
a second time after the first time, and
performance of the task by the first machine together with the second machine;
determining, based at least in part on the third sensor data, an updated recommended setting associated with the first machine;
causing the display of the first machine to provide a second recommendation, the second recommendation including the updated recommended setting;
receiving, via the display of the first machine, an indication of acceptance of the second recommendation; and
based on receiving the indication of acceptance of the second recommendation, modifying operation of the first machine, in accordance with the updated recommended setting.

9. The method of claim 8, wherein the first sensor is disposed on the first machine and the
second sensor is disposed on the second machine.

10. The method of claim 8,
wherein modifying operation of the at least one of the first machine or the second machine comprises causing the computing device of the first machine to configure the first machine based at least in part on the first recommended setting.

11. The method of claim 8, further comprising:
receiving first machine production data quantifying an amount of work produced by the first machine over a period of time; and
generating the first recommended setting based on a statistical correlation between the first sensor data and the first machine production data.

12. The method of claim 8, further comprising:
determining, based at least in part on the first sensor data, a boundary defining a perimeter of a work surface associated with the worksite; and
causing the display of the first machine to provide a third recommendation, the third recommendation comprising a recommended path for the first machine to travel, based at least in part on the boundary.

13. The method of claim 8, wherein modifying operation of the at least one of the first machine or the second machine comprises
causing a distance to be maintained between the first machine and the second machine.

14. The method of claim 8, wherein the first recommendation is associated with the first time, and the display comprises a first display, the method further comprising:
determining, based at least in part on the first sensor data and at a third time, an amount of a consumable component for use by the first machine wherein the third time is at least one of prior to the first time and prior to initiating operation of the first machine at the worksite, or after the first time and after the first machine has operated at the worksite for a time period; and
causing the first display of the first machine or a second display corresponding to another computing device associated with the first machine to provide a third recommendation, the third recommendation indicating the amount of the consumable component to include on the first machine.

15. A cold planer disposed at a worksite, the cold planer comprising:
a first sensor;
a display;
one or more processors; and
one or more computer-readable media storing instructions that, when executed by the one or more processors, cause the one or more processors to perform operations comprising:
sending, to a remote computing device and via a network, first sensor data associated with the worksite, the first sensor data generated by the first sensor, at a first time, as the cold planer performs a task at the worksite;
receiving, from the remote computing device, a recommended setting associated with an operating parameter of the cold planer, wherein the remote computing device generates the recommended setting based at least in part on:
the first sensor data, and
second sensor data generated by a second sensor, wherein the second sensor is:
carried by an additional mobile machine disposed proximate the cold planer during performance of the task, and
of a different type than the first sensor;
presenting a first recommendation on the display, the first recommendation including the recommended setting;
receiving, via a user interface associated with the display, an indication of acceptance of the recommended setting;
modifying an operation of a component of the cold planer based at least in part on the recommended setting, wherein modifying the operation of the component changes interaction between the cold planer and the additional mobile machine during performance of the task;
receiving, from the first sensor, third sensor data associated with:
a second time after the first time, and
performance of the task by the cold planer together with the additional mobile machine;
determining, based at least in part on the third sensor data, an updated recommended setting associated with the cold planer;
causing the display to provide a second recommendation, the second recommendation including the updated recommended setting;
receiving, via the display, an indication of acceptance of the second recommendation; and
based on receiving the indication of acceptance of the second recommendation, modifying operation of the component of the cold planer, in accordance with the updated recommended setting.

16. The cold planer of claim 15, the operations further comprising:
receiving, from the remote computing device and based at least in part on the first sensor data, an amount of a consumable component to associate with the cold planer; and
presenting a third recommendation on the display, the third recommendation comprising a recommendation to load the amount of the consumable component on the cold planer.

17. The cold planer of claim 15, the operations further comprising:
receiving, from the remote computing device and based at least in part on the first sensor data, a recommended path for the cold planer to travel through the worksite; and
presenting a third recommendation on the display, the third recommendation comprising the recommended path.

18. The cold planer of claim 15, the operations further comprising:
determining production data associated with operation of the cold planer at the worksite; and
sending the production data to the remote computing device for storage.

* * * * *